(12) United States Patent
Ndjiki-Nya

(10) Patent No.: US 8,144,161 B2
(45) Date of Patent: Mar. 27, 2012

(54) TEXTURE SYNTHESIS

(75) Inventor: Patrick Ndjiki-Nya, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1144 days.

(21) Appl. No.: 11/952,793

(22) Filed: Dec. 7, 2007

(65) Prior Publication Data
US 2008/0150955 A1    Jun. 26, 2008

Related U.S. Application Data

(60) Provisional application No. 60/869,306, filed on Dec. 8, 2006.

(51) Int. Cl.
*G09G 5/00* (2006.01)

(52) U.S. Cl. ........ 345/582; 345/586; 345/595; 345/606; 345/607; 345/615; 345/637; 345/640; 345/552; 382/240; 382/284; 382/294

(58) Field of Classification Search ........................ None
See application file for complete search history.

(56) References Cited

U.S. PATENT DOCUMENTS

| 7,418,131 | B2 * | 8/2008 | Wang et al. | ................. | 382/165 |
| 2005/0168482 | A1 | 8/2005 | Criminisi et al. | | |
| 2006/0045372 | A1 | 3/2006 | Wang et al. | | |

OTHER PUBLICATIONS

Li, B. et al.; *An image inpainting method*; 2005; School of Computer Science & Engineering, BeiHang University.
Komodakis, N. et al.; *Image Completion Using Global Optimization*; 2006; Computer Science Dept., Univ. of Crete. Proceedings of the 2006 IEEE Computer Society Conference on Computer Vision and Pattern Recognition—vol. 1 p. 442-52.
Kwatra, et al.; "Graphcut Textures: Image and Video Synthesis Using Graph Cuts"; Jul. 1, 2003; ACM Transactions on Graphics, ACM.
Ndjiki-Nya, et al.; "A New Generic Texture Synthesis Approach for Enhanced H.264/MPEG4-AVC Video Coding"; Jan. 1, 2006; Visual Content Processing and Representation Lecture Notes in Computer Science.
Ndjiki-Nya, et al.; "Improved H.264/AVC coding using texture analysis and synthesis"; Sep. 14-17, 2003; Proceedings 2003 Int'l Conference on Image Processing, IEEE.
Musmann, et al.; "Object-oriented Analysis-Synthesis Coding of Moving Images"; Oct. 1, 1989; Signal Processing, Image Communication Elsevier Science Publishers.
Gilge, et al.; "Region-oriented Texture Coding"; Jan. 1, 1996; Video Coding: The Second Generation Approach.

* cited by examiner

*Primary Examiner* — Antonio A Caschera
(74) *Attorney, Agent, or Firm* — Michael A. Glenn; Glenn Patent Group

(57) ABSTRACT

A texture synthesis device, which has a determinator for determining a prioritization among regions to be synthesized of an area to be synthesized, as a function of image information in an area adjacent to the area to be synthesized, and a synthesizer for synthesizing the regions to be synthesized in an order that depends on the prioritization.

20 Claims, 4 Drawing Sheets

FIGURE 5A
FIGURE 5B
FIGURE 5C
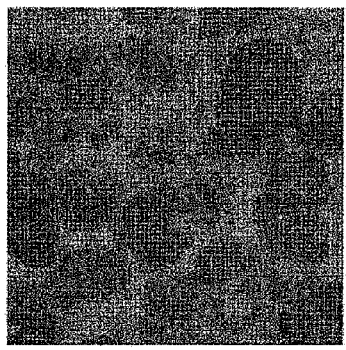
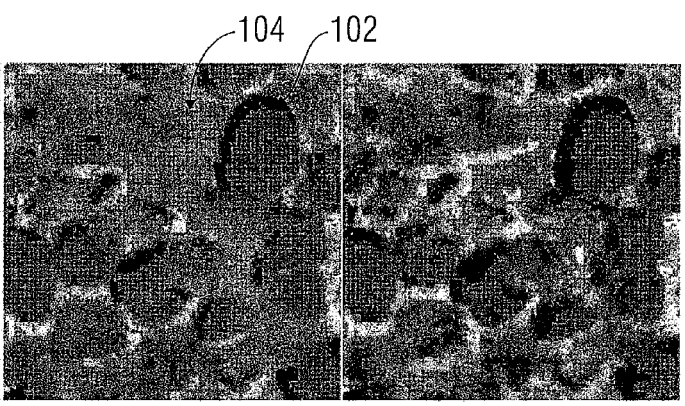
FIGURE 5D
FIGURE 5E
FIGURE 5F
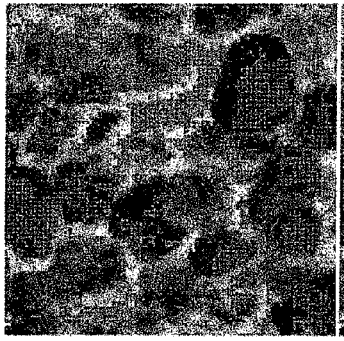
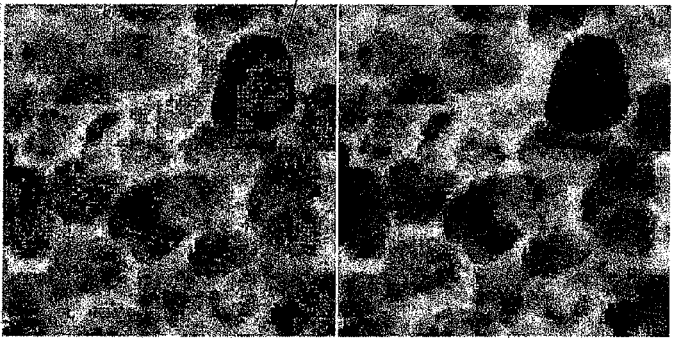

TEXTURE SYNTHESIS

CROSS-REFERENCE TO RELATED APPLICATIONS

This application claims priority from U.S. Provisional Patent Application Ser. No. 60/869,306, which was filed on Dec. 8, 2006, and is incorporated herein in its entirety by reference.

TECHNICAL FIELD

The present invention relates to texture synthesis.

BACKGROUND

Texture synthesis refers to an operation where image components, such as water, grass, trees, clouds, sand, etc., that are not present in an original image material, are filled artificially or synthesized, on the basis of known textures, such as from the image original material itself. In video coding, for example, taking into account these textures in the coding means a large data rate effort, as textures are usually rich in detail and are therefore laborious to code. Therefore, one sometimes abstains from performing an exact reconstruction of such textures, or this part is even exempt from the coding. Finding such texture areas that do not need exact reconstruction is referred to as texture analysis. On the decoder side, the respective omitted texture area may then be synthesized by texture synthesis, as discussed above. A texture synthesis, however, may be employed not only for reducing the data rate in the transmission of video data. Rather, texture synthesis is applicable also as a means for image/video restoration.

One goal of texture synthesis should be to fill the area to be synthesized such that the synthesization is unnoticeable for the viewer. A synthesized texture should therefore have properties that are as similar as possible to the image area adjacent to this area to be synthesized. Furthermore, the transitions should be as unnoticeable as possible for the viewer.

SUMMARY

According to an embodiment, a texture synthesis device may have: a determinator for determining a prioritization among regions to be synthesized of an area to be synthesized as a function of image information in an area adjacent to the area to be synthesized; and a synthesizer for synthesizing the regions to be synthesized in an order that depends on the prioritization, wherein the determinator and the synthesizer are formed such that, after a synthesization of one or several of the regions to be synthesized by the synthesizer, the determinator the prioritization iteratively determines the prioritization among the remaining regions to be synthesized, as a function of the image information in the area adjacent to the area to be synthesized, including the one or several synthesized regions, and wherein the synthesizer, in the case that same does not find a suitable synthesization for any of the remaining regions to be synthesized, is formed to cancel the synthesization and to fill the remaining regions to be synthesized by means of interpolation.

According to another embodiment, a texture synthesis device may have: a determinator for determining a prioritization among regions to be synthesized of an area to be synthesized as a function of image information in an area adjacent to the area to be synthesized; and a synthesizer for synthesizing the regions to be synthesized in an order that depends on the prioritization, wherein the determinator and the synthesizer are formed to work iteratively, and such that in the case that the synthesizer does not find a suitable synthesization for a region to be synthesized whose turn it is according to the order, this region to be synthesized is blocked and the synthesizer continues with a non-locked region to be synthesized whose turn it is next, according to the order, and, in subsequent iterations, ignores the blocked region to be synthesized regardless of its priority, and in the case that the synthesizer syntheses a region to be synthesized which is adjacent to the blocked region to be synthesized, the blocked region to be synthesized is unblocked, so that the priority of the unblocked region to be synthesized, in further iterations, is again taken into account.

According to another embodiment, a method for texture synthesis may have the steps of: determining a prioritization among regions to be synthesized of an area to be synthesized, as a function of image information in an area adjacent to the area to be synthesized; and synthesizing of the regions to be synthesized in an order that depends on the prioritization, wherein the determining and the synthesizing are performed iteratively, such that in the case that no suitable synthesization is found for a region to be synthesized whose turn it is according to the order, this region to be synthesized is blocked, it is continued, in the synthesization, with a non-locked region to be synthesized whose turn it is next, according to the order, and, in subsequent iterations, the blocked region to be synthesized is ignored regardless of its priority, and in the case that a region to be synthesized which is adjacent to the blocked region to be synthesized, is synthesized, the blocked region to be synthesized is unblocked, so that the priority of the unblocked region to be synthesized, in subsequent iterations, is again taken into account.

According to another embodiment, a method for texture synthesis may have the steps of: determining a prioritization among regions to be synthesized of an area to be synthesized, as a function of image information in an area adjacent to the area to be synthesized; and synthesizing the regions to be synthesized in an order that depends on the prioritization, wherein determining and synthesizing are performed such that, after a synthesization of one or several of the regions to be synthesized, the prioritization is iteratively determined among the remaining regions to be synthesized, as a function of the image information in the area adjacent to the area to be synthesized, including the one or several synthesized regions, and wherein synthesizing, in the case that no suitable synthesization for any of the remaining regions to be synthesized is found, is performed so as to cancel the synthesization and to fill the remaining regions to be synthesized by means of interpolation.

According to another embodiment, a computer program may have a program code for performing, when the computer program is executed on a computer, a method for texture synthesis, wherein the method may have the steps of: determining a prioritization among regions to be synthesized of an area to be synthesized, as a function of image information in an area adjacent to the area to be synthesized; and synthesizing of the regions to be synthesized in an order that depends on the prioritization, wherein the determining and the synthesizing are performed iteratively, such that in the case that no suitable synthesization is found for a region to be synthesized whose turn it is according to the order, this region to be synthesized is blocked, it is continued, in the synthesization, with a non-locked region to be synthesized whose turn it is next, according to the order, and, in subsequent iterations, the blocked region to be synthesized is ignored regardless of its priority, and in the case that a region to be synthesized which is adjacent to the blocked region to be synthesized, is synthesized, the blocked region to be synthesized is unblocked, so that the priority of the unblocked region to be synthesized, in subsequent iterations, is again taken into account.

According to another embodiment, a computer program may have a program code for performing, when the computer program is executed on a computer, a method for texture synthesis, wherein the method may have the steps of: determining a prioritization among regions to be synthesized of an area to be synthesized, as a function of image information in an area adjacent to the area to be synthesized; and synthesizing the regions to be synthesized in an order that depends on the prioritization, wherein determining and synthesizing are performed such that, after a synthesization of one or several of the regions to be synthesized, the prioritization is iteratively determined among the remaining regions to be synthesized, as a function of the image information in the area adjacent to the area to be synthesized, including the one or several synthesized regions, and wherein synthesizing, in the case that no suitable synthesization for any of the remaining regions to be synthesized is found, is performed so as to cancel the synthesization and to fill the remaining regions to be synthesized by means of interpolation.

According to embodiments of the present invention, a texture synthesis device comprises a means for determining a prioritization among regions to be synthesized of an area to be synthesized, depending on image information in an area adjacent to the area to be synthesized, and a means for synthesizing the regions to be synthesized in an order depending on the prioritization.

A finding of the present invention is that a quality of a synthesized texture may be improved if the sequence of the locations of the synthesization is not simply set independently of the area adjacent to the area to be synthesized, but is adapted to the image information in this adjacent area.

According to an embodiment of the present invention, for example, regions to be synthesized that are adjacent to regions with image information that are relevant for human perception are more highly prioritized than those that are adjacent to regions with image information that is less relevant for human perception, it being possible to use, for example, a spatial object outline value may be used as a measure of the relevance for human perception, measured, for example, in an intensity or length of the image information gradient. In this way, the texture synthesis first starts in the vicinity of locations that are more relevant, in terms of perception, of the area adjacent to the area to be synthesized, and ends at locations that are less relevant in terms of perception. In this way, use is made of the circumstance that, according to experience, texture synthesis leads to a higher-quality synthesization at the beginning of the filling, or synthesizing, of an area to be synthesized than at the end, where only few of the regions to be synthesized still exist.

BRIEF DESCRIPTION OF THE DRAWINGS

Embodiments of the present invention will be detailed subsequently referring to the appended drawings, in which:

FIG. 4b shows an example of a texture image partially filled that was obtained by up-scaling the original texture example of FIG. 4a; and FIGS. 5a-f show a succession of six states of the texture image of FIG. 4b, from the original state according to FIG. 4b up to the completely filled state according to an embodiment of the present invention.

DETAILED DESCRIPTION

Figure 1:
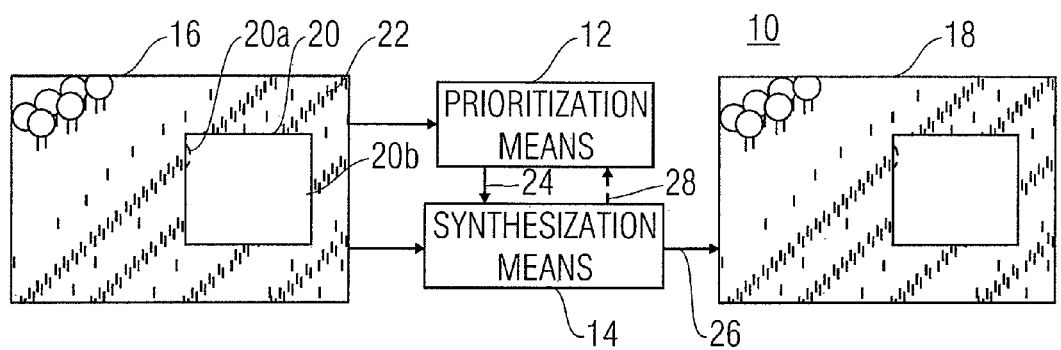
FIG. 1 shows a block diagram of a texture synthesis device according to an embodiment of the present invention.

FIG. 1 shows a texture synthesis device 10 according to the present invention. It comprises a prioritization means 12 and a synthesization means 14. In FIG. 1, it is assumed, as an example, that the image starting material 16 that is to be partially synthesized by the texture synthesis device 10 is a still image or stationary image that is to be conveyed into a completely filled image 18 by means of texture synthesis by the texture synthesis device 10. In the following description, however, there will also be an indication concerning the fact that the present application is also applicable to texture synthesis in the case of a video as the starting material.

In particular, the texture synthesis device 10 is responsible for synthesizing an area 20 to be synthesized within the image 16, i.e. filling the missing image information in this area so that the artificial filling in the resulting image 18 will be unnoticeable for the viewer.

For this purpose, the prioritization means 12 as well as the synthesization means 14 have access to the image 16 with the area 20 to be synthesized. The prioritization means 12 determines a prioritization among regions to be synthesized of the area 20 to be synthesized, depending on image information in the area 22 adjacent to the area 20 to be synthesized. The synthesization means 14 synthesizes the area to be synthesized in that same fills, or synthesizes, the regions to be synthesized in an order that depends on the prioritization 24 received from the prioritization means. The result, i.e. the synthesized image 18, is output by the synthesization means 14 to an output 26 of the texture synthesis device 10.

As is indicated by a broken arrow 28 and as will be discussed in more detail below, it may be provided that the prioritization means 12 and the synthesization means 14 influence each other during the synthesization of the area 20 to be synthesized such that the prioritization means 12 updates its prioritization 24 among the regions that are still to be synthesized depending on the regions of the area 20 to be synthesized that have been synthesized so far.

Since the design of the texture synthesis device 10 has been described and a rough overview of the mode of operation of the individual means of same has been given above, the mode of operation of the texture synthesis device 10 of FIG. 1 will be discussed in more detail below in conjunction with FIG. 2 according to an embodiment of the present invention.

Figure 2:
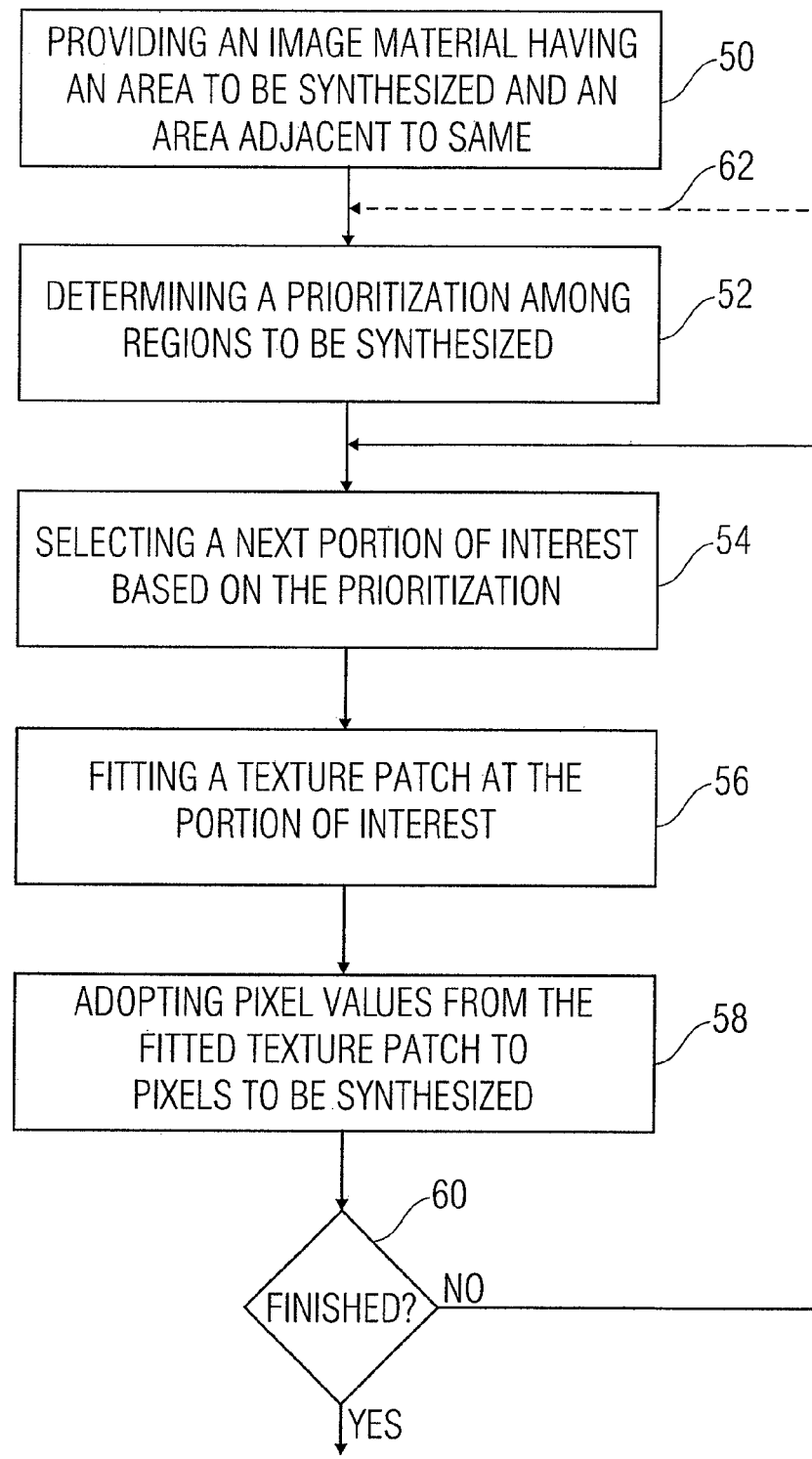
FIG. 2 shows a flowchart for illustrating the mode of operation of the device of FIG. 1.

The method flow illustrated in FIG. 2 begins in step 50 with the provision of an image material with an area to be synthesized and an area that is adjacent to same. As was mentioned before, the image material provided is a still image 16 in the case of FIG. 1, as an example. The provision comprises, for example, only the enabling of an access to the image information of the image material 16 in the area 22 that is adjacent to the area 20 to be synthesized. For example, the image information provided does not have to take up the entire rest of the image 16 outside of the area 20 to be synthesized. The image information provided may, for example, also be limited to an area along the border of the area 20 to be synthesized. Furthermore, it is possible that, contrary to the representation in FIG. 1, the area 20 to be synthesized and/or the area adjacent to same and comprising image information is a non-contiguous area.

The provision in step 50 may also comprise a decoding of a coded data stream, such as a decompression. Furthermore, as will yet be discussed in more detail below with reference to FIGS. 4 and 5, the provision 50 may also comprise a spatial scaling of a starting image material, which distributes, or scales up, the individual image points or pixels of this starting material to a pixel array with more pixels than the image starting material comprises.

After the provision 50, in step 52 the prioritization means 12 carries out a determination of a prioritization among sub-regions to be synthesized of the area 20 to be synthesized. For this purpose, the prioritization means 12 uses, for example, an already existing subdivision of the area to be synthesized, such as the subdivision into pixels, however, a subdivision into regions of several or clusters of pixels also being possible. The prioritization means 12 carries out the prioritization 24 depending on the image information in the area 22 adjacent to the area 20 to be synthesized. In particular, the prioritization means 12 checks, for example, for each region to be synthesized, the image information located in a vicinity of this region to be synthesized, such as at a predetermined maximum distance from or in a predetermined field around same, whether this information includes features relevant for human perception, such as object outlines or the like, and adjusts the priority for a region to be synthesized the higher, the higher the values of the relevant features located in the neighborhood are.

The relevance to human perception can be taken into account in the priority determination 52 by, for example, evaluating, for each region to be synthesized, the image information gradients, such as the gradients of the luminance, in the adjacent image information. For example, in step 52 the prioritization means 12 folds a spatial course of an intensity, or a length of an image information gradient across the area 22 adjacent to the area 20 to be synthesized, with a suitable standardized neighboring function, such as a spatially limited rectangle function, in order to obtain a priority value per pixel. In addition, it is possible that the result of the above-mentioned check of the image information in the neighborhood of a region to be synthesized for features that are relevant for human perception is extended to the respective region to be synthesized, for example by interpolation or extrapolation. In addition, it will become clear from the subsequently described example according to FIGS. 4a-5f that in the case of the synthesization in the case of the up-scaling, it is possible to derive the outline value in the previously known adjacent image areas and/or in the regions to be synthesized from the not yet scaled original image.

Furthermore, the prioritization may be made to depend upon how many already synthesized pixels or pixels belonging to the area 22 adjacent to the area 20 to be synthesized are adjacent to the respective pixel to be synthesized, in order to, for example, assign a higher prioritization to such pixels that comprise more hereof.

The result of step 52 is a prioritization among the regions to be synthesized, such as pixels, within the area 20. In other words, this prioritization sets an order among the regions to be synthesized. This prioritization 24 sends the means 12 to the synthesization means 14, which, in a step 54, subsequently selects a next portion of interest of the area 20 to be synthesized depending on this prioritization. Step 54 may, for example, simply be selecting the region to be synthesized that was assigned the highest priority value in step 52. However, in step 54 also an agglomeration, or aggregation, of several regions to be synthesized and having a high priority may be selected over isolated regions to be synthesized and having a higher priority, such as by low-pass filtering the priority value course, which is discussed as an example with respect to step 52, across the pixels in the area 20.

The portion of interest selected in step 54 serves to indicate the approximate location where the synthesization is to be carried out next, which is performed in step 56 by the synchronizing means 14 in that it tries to fit a texture patch into the image information 22 at the portion of interest. The synthesization means 14 acquires the texture patch, or patch, for example, from a portion that is located in the part 22 of the image 16, which is located outside of the area 20 to be synthesized. However, the texture patch may also originate from a predefined library of texture patches. The texture patch is selected such that it conveys a similar impression in a viewer as the original missing contents of the area 20 to be synthesized at this location. For this purpose, for example, the synthesization means 14 is given a portion from the image information 22 of the image 16 from which the synthesization means 14 may suitably select a texture patch. The synthesization means 14 tries to shift the texture patch thus obtained which represents, for example, a rectangular texture field, around the portion of interest across the area 20 to be synthesized in such a way that this texture patch is most similar to the image information in the area 22 at the shifted position, according to a suitable similarity measure. In other words, in step 56, the synthesization means 14 searches for a position of the texture patch among the possible positions, in which the texture patch overlaps with the portion of interest, or the region to be synthesized which was selected in step 54, such that this selected position results in the least difference, or at least a local difference minimum, between the image information of the texture patch and the respective image information in the image 16.

In step 58, the synthesization means 14 then adopts image information from the thus fitted texture patch into the regions to be synthesized with which the fitted texture patch overlaps. The adoption in step 58 may optionally be made to depend on a check as to whether the image information, or pixel values, to be adopted would lead to undesired artifacts, which would lie, for example, outside of the color space that is spanned by its adjacent pixels, in order to not fill the respective pixels, or regions to be synthesized, with the respective image information of the texture patch until the case of a result of the check indicating that no such artifacts will arise.

By step 58, one or several of the regions to be synthesized within the area 20 to be synthesized are synthesized. In FIG. 1, a division of the area 20 to be synthesized into an already synthesized area 20a and an area 20b not yet to be synthesized is indicated accordingly by a dotted line.

In a step 60, a check is subsequently made as to whether further regions to be synthesized exist or whether an area 20b still to be synthesized exists. If this is the case, according to an embodiment, the synthesization means 14 continues with step 54 by performing the synthesization of remaining areas to be synthesized in the area 20b according to the existing prioritization, the synthesization means 14 using the already synthesized areas 20a in step 56 as well as the image information from the area 22. In addition, it is possible that, in step 58, the synthesization means 14 again adopts image information for already synthesized regions from the texture patch or, as the case may be, iteratively replaces them with the latter, in the case that a fitted-in texture patch also overlaps with already synthesized regions in the area 20a, for example when the current similarity measure indicates a higher level of similarity than was underlying the image information adoption in these regions at that time, or the last time.

As is indicated by a dotted arrow 62 in FIG. 2, it is further possible that in step 60, in the case of establishing the existence of further regions to be synthesized, the prioritization means 12 uses the synthesization from step 58 to update the prioritization by re-determining, in step 52, the prioritization among the regions still to be synthesized within the area 20b not yet synthesized, it being possible to limit the update to an environment of the portion of interest, as new image information as well as new locations resulted only there by synthesized regions 20a where, as the case may be, a gradient intensity may be adjustable. In this case, step 52 is followed by the selection of the next portion of interest based on the updated prioritization, etc.

Should one find in step 60, that no further regions to be synthesized still exist, the synthesization is finished, i.e. the area 20 to be synthesized in the image 16 is completely filled, as is shown in the image 18 in FIG. 1.

Referring to the above description of FIG. 2, it should be understood that it is possible to perform the update of the prioritization, as it is indicated by the dotted arrow 62, not after each fitting 56, for example, but after a fixed number of fittings or a variable number of fittings, for example depending on whether the next portion of interest would have a predetermined distance from the most recent portion of interest according to the not yet updated prioritization, so that an update would lead to no other result. Further, it should explicitly be pointed out that it is not necessary to update the prioritization at all. In the case of the non-updating, for example, the further filling of the area to be synthesized is performed from the time when no region yet to be synthesized is adjacent anymore to the image information 20 of the area 22 adjacent to the original area 20 to be synthesized, with an order of the portions of interest that no longer depends on renewed prioritization calculations or is only derived from the old prioritization determination, by performing, for example, the further synthesization along a closed borderline between the already synthesized area 20a and the not yet synthesized area 20b in a respective order, to synthesize from outside to inside, an area 20 to be synthesized which, as an example, is represented as being contiguous in FIG. 1.

Figure 3:
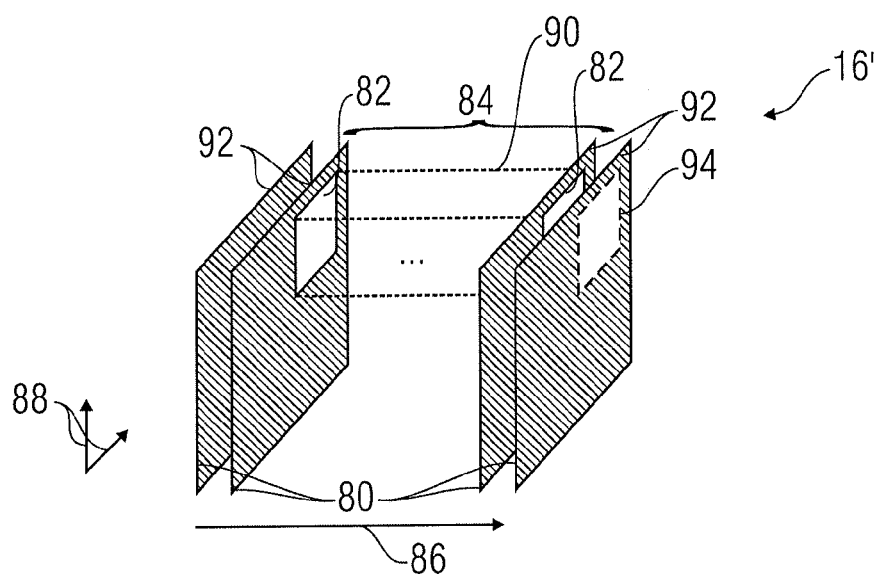
FIG. 3 shows a sketch for illustrating an example of an area to be synthesized in the case of video material.

The above description primarily referred to the exemplary case of texture synthesis with respect to still images. However, the above description is also readily applicable to texture synthesis of video sequences, i.e. sequences of frames or images. FIG. 3, for example, shows a video or a video sequence 16' as an example of an image original material for the texture synthesis device of FIG. 1. The video 16' comprises several consecutive frames 80, portions 82 to be synthesized, in a sequence 84 of consecutive frames 80 of this video 16', defining an area 90 to be synthesized which extends both temporally, or in a time direction 86, and spatially, or in the two spatial directions 88, such as row and column directions. FIG. 3 shows the exemplary case where the area 90 to be synthesized that is spatially and temporally extended is an area that is rectangular in all three directions 88, 86. However, it is further possible that the individual portions 82 to be synthesized in the frames 84 differ and, for example, overlap only partially to form a contiguous area 90 to be synthesized, or even do not overlap to define a non-contiguous, temporally and spatially extended area 90 to be synthesized. In a transfer to the above description, in step 56 a texture patch volume may be used for fitting, or filling, i.e. a temporal sequence of a texture patch. Furthermore, one could take into account in step 52 that an area 92, adjacent to the area 90 to be synthesized, of the video 16', which is represented in a hatched manner in FIG. 3, is located not only laterally, i.e. spatially, or in the space direction 88, adjacently to the area 90 to be synthesized, but further adjacently also in a temporal direction, as is indicated, for example, by the area 94, represented in a dotted manner, within the frame 80 that temporally follows the area 90 to be synthesized.

Above the mode of operation of the device of FIG. 1 was described in conjunction with FIGS. 1 to 3—at least as far as the illustrations in the figures are concerned—against the background that the area to be synthesized was a contiguous and compact area, as may be the case, for example, in the reconstruction of defective image materials or in the synthesis of image materials coded by texture analysis. Below, the mode of operation of the device of FIG. 1 will be described in slightly more detail against the background of an up-scaling of an image. In contrast to a simple up-scaling, where essentially each pixel of an original image is spread to, for example, four pixels in the case of an isotropic scaling by the factor 2, in the up-scaling that will be described below, the pixels of the starting image are distributed individually to pixel positions of the target array with a mutual spacing of one or several pixels, the remaining gaps then being filled in the above described manner.

Figure 4A:
FIG. 4a shows an example of an original texture example.
Figure 4B:
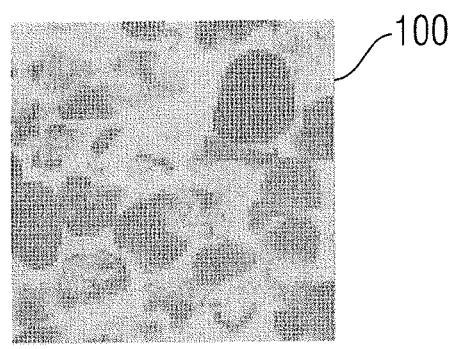

In this scenario of the spatial scaling, a start image, such as the one shown in FIG. 4a, is up-scaled by evenly distributing the individual pixels of the start image (FIG. 4a) to the pixel positions of a target array of pixel positions, the result being represented in FIG. 4b. In other words, in a provision 50 the output image (4b)—or the output video in the case of video material, which, however, is not assumed as an example below—is initialized with known pixel values of the original texture example (FIG. 4a). In particular, the pixel values, or pixels, of the original texture image of FIG. 4a are placed at every $k_x^{th}$ and $k_y^{th}$ position in an x and a y direction, respectively. The initialization of the output signal, the result of which is represented in FIG. 4b, makes it apparent that the unknown pixel positions that are represented in a special shade of gray 100 represent a large part of the total amount of pixels in the output image of FIG. 4b, namely $1-1/(k_x \cdot k_y)$. This means that, on the assumption that $k_x = k_y = 2$, 75% of the scan values of the output image are to be synthesized, or to be filled.

According to step 52, the synthesis strategy that was already mentioned above is now used for filling the up-scaled image, which synthesis strategy preserves, in the form of a deterministic approach, properties of the original image that are relevant in terms of perception. The following description describes step 52 in slightly more detail than was the case in the foregoing, however, the present remarks also being readily applicable to the application examples that were mentioned in detail in the foregoing and are indicated in FIGS. 1 and 3. Particularly, each pixel position in the output image of FIG. 4b is now assigned a content-based priority coefficient that determines the processing chronology, or the processing order of the positions to be synthesized. The priority is high if features that are relevant in terms of perception, such as object outlines, are available, or have a high parameter value, in the respective neighborhood. The priority is low if hardly any or only a few of such features are available at and/or around the position of interest. Further features, or dependences, such as the number of known neighbors, or pixels, with a pixel value that is already pre-initialized or synthesized, or any other a priori knowledge or any other application-specific knowledge may, of course, also be integrated into the formation of the priority coefficient p(x,y) in order to improve its information value.

The different terms of the priority coefficient should be standardized to the same range of values and may, for example, be combined in a multiplicative manner in order to lead, for example, to the following determination calculation for the priority coefficient p(x,y):

$$p(x,y) = \|\delta(x,y)\| \cdot h_1(x,y) \cdot h_2(x,y) \cdot \ldots$$

Alternatively, of course, a linear combination may also be used to calculate the priority coefficient, namely by $$p(x,y) = \alpha_0 \|\delta(x,y)\| + \alpha_1 \cdot h_1(x,y) + \alpha_2 \cdot h_2(x,y) \cdot \ldots$$

Of course, not only any suitable linear combination is possible, but also non-linear operations are imaginable.

In the above equations, $\delta(x,y)$ represents the gradient vector of the output image at the position (x,y), the gradient being formed, for example, via the luminance. $\|a\|$ indicates the standard of a vector a. $h_i(x,y)$ are optional priority coefficient terms, and $\alpha_i$ represents the weightings of the linear combinations represented above.

Independently of the features relevant in terms of perception that were used to determine the priority coefficients, one should differentiate between the known and unknown pixels, or the pixels to be synthesized. Object outlines may, for example, be determined by calculating the intensity of the gradients in the original texture image (FIG. 4a) for the known pixel positions. These intensities may then be assigned to the respective pixel positions 100, in the output image (FIG. 4b). The gradients at unknown pixel positions may either be set, or initialized, to a predetermined value, for example 0, or be derived, or initialized, from adjacent known gradients by interpolation or extrapolation.

In the subsequent steps 54 to 58, the pixel positions with unknown neighbors are processed in a sequence of descending priority. The unknown pixels are filled by block fitting. This means that the original texture image of FIG. 4a is split into patches, or tiles, such as rectangular areas which may or may not overlap. These patches are shifted laterally across the position that is currently of interest, namely the one with the highest priority, within a limited search area. Thereby, as high a level of matching as possible with the known pixel positions is achieved. Translatory or also more complex movement models may be used in the shifting. The patch and the shift which achieved the best match are selected to fill the missing pixel positions. Any suitable similarity measure may be used for finding the match, such as the mean square error, or MSE, between the pixel values of the patch and the pixel values of the known pixel positions. To avoid undesired artifacts, a consistency test or several consistency tests may be performed prior to the filling of the unknown pixels by a patch, said test(s) being provided, for example, to ensure that the respective candidate pixel that is provided for filling lies within the color range of its future neighbors. In an alternative consistency test for the case of the up-scaling it may be provided that an n×n neighborhood around a tracing point, such as a 3×3 neighborhood with a tracing point at the center of the 3×3 mask, is considered to individually evaluate the vertical, horizontal and diagonal neighbors, respectively, to the tracing point in the up-scaled target image. For example, the inserted, or synthesized, pixel value or the inserted, or synthesized, color must lie within the borders given by the respective pair of neighbors, i.e. diagonally, horizontally and vertically, i.e. within the intersection of the intervals given by the pixel values of the respective neighboring pairs, i.e. diagonally, horizontally and vertically. If this is not the case, no pixel from the patch is inserted into the up-scaled image.

Previously filled positions may be updated in later iterations if a better match is found, as was described above.

As was described above with reference to the dotted line 62, the priority coefficients may be updated iteratively. In doing so, the update may be limited to those coefficients whose respective neighbors were modified in the previous iteration due to newly inserted, or filled, pixel positions. Furthermore, the update may concern only a subset of the terms of the priority coefficient of these pixel positions, such as the term that refers to the number of known neighbors, so that the update may also be limited to only these terms.

FIGS. 5a-f show an experimental result that was obtained by the steps that were just discussed with reference to FIGS. 4a and 4b. In this context, experiments were performed in which the priority coefficient was defined as follows:

$$p(x,y) = \|\delta(x,y)\| \cdot h_1(x,y)$$

where $h_1(x,y)$ was defined as a function of the number of valid pixels, i.e. pixels that were already synthesized or that were already known before the beginning of the synthesization, in the neighborhood of an output pixel position (x,y), e.g. in the neighborhood consisting of the diagonally, horizontally and vertically adjacent pixel positions. Consequently, $h_1(x,y)$ and consequently also p(x,y) were updated after each iteration. A 9×9 neighborhood of pixel positions was used for the synthesis. For example, 9×9 texture patches were used in step 56. Unknown gradients were initialized with 0. Furthermore, non-overlapping texture patches from the original image of FIG. 4a were used in combination with a translatory movement model. The MSE was used as a similarity criterion, and unknown pixel positions were replaced only once, i.e. an overwriting of already synthesized pixel values was not carried out.

FIGS. 5a-f show the iteration that ensues, from the state according to FIG. 4b (corresponds to FIG. 5a) up to the state where all pixel positions to be synthesized have been synthesized (FIG. 5f). In other words, FIGS. 5a-5f show the ensuing result at different iteration times of the synthesis process. Particularly, a subject was a 75×75 original image (FIG. 4a) from the Brodatz test set that was scaled with $k_x = k_y = 2$ to 150×150 pixels. It is apparent that due to the prioritization, the texture synthesis according to FIG. 2 tends to synthesize object outlines first (cf., for example, 102 in FIG. 5b), while the inside 104 of the objects is processed, or synthesized, only subsequently, as is apparent, for example, in FIGS. 5c-e.

The convergence behavior of iterative procedures described above towards a solution of the given synthesis problem is a critical point. Actually, it is possible that the approach according to FIG. 2 will get caught up at a position of high priority if no suitable countermeasures are taken. This may happen, for example, if some of the neighbors of the highest-priority position that is currently of interest cannot be filled using the patches of the original texture image. To avoid this, positions that do not obtain any newly updated neighbors may be blocked and ignored in the further execution of the priority order in the subsequent iterations, regardless of their specific priority. Consequently, in this case the position with the next priority up is selected 54 for the next iteration. A blocked output pixel position will be unblocked only if the respective neighbor was updated in the previous iteration. The algorithm may stop early, i.e. before all pixel positions to be synthesized were synthesized, if the number of iterations exceeded a particular threshold value or all positions with a priority coefficient larger than 0 are also blocked All such remaining invalid positions could then be assigned a pixel value by interpolation.

In the example of FIG. 5f, only 100 pixels, for example, were interpolated in this way, i.e. less than 1%. The interpolation is not critical at this point, as most of the invalid pixels are far away from the object borders, or object outlines, and thus are typically located in homogeneous regions (cf. 106 in FIG. 5e).

In the foregoing, according to an embodiment, an interpolation was used, which is performed in an emergency to close remaining gaps in the area to be synthesized. The interpolation may rely on the pixels previously ascertained by means of synthesis, or alternatively, may refer only to the original image signal. In other words, the area to be synthesized may be estimated, for example, solely on the basis of the original image information around the area to by synthesized, by interpolation or extrapolation, wherein, when the pixels are left over at the end of the synthesization described in the foregoing, these pixels are filled from the interpolated image. Alternatively, the interpolation is performed only when the synthesis cannot advance anymore, the synthesized pixels then being employed for interpolation as well. In the scaling embodiment, for example, the pixels missing in the scaled image are copied from the interpolated signal. However, the same also works with the filling embodiment according to FIGS. 1 to 3.

Further, it is possible that, in the above embodiments, further postprocessing steps or one postprocessing step could be provided both for the filling of a contiguous area according to FIGS. 1 to 3 and for the up-scaling. Such a postprocessing step could include, for example, the application of a median filter to the synthesized image.

The above embodiments thus represented a concept for a texture synthesis which takes structure into account. The embodiments are useful for applications where a given texture example is to be extended to an arbitrary size, but are not necessarily limited to such applications. The image/video restoration, the spatial scaling, the conversion from a nested format, or field format, to a progressive format, i.e. a format in which every frame was recorded completely at any one time, and the image/video synthesis represent a non-exhaustive list of exemplary examples of application, in which embodiments described above may be applied advantageously. There were primarily two key assumptions underlying the above embodiments, namely that the order of filling the region to be synthesized influences the quality of the synthesis result, and that dominant structure information in the given texture examples needs to be reliably extended, or propagated, into the unknown area, or the unknown volume, to take into account subjectively eye-catching features of the reference texture level. In this respect, the above embodiments represent an efficient realization of such a texture synthesis which takes structure into account.

Finally, it should be understood that, depending on the circumstances, the above embodiments for texture synthesis may be implemented in hardware or in software. The implementation may be performed on a storage medium, particularly a disc or CD with control signals which may be read-out electronically, which may cooperate with a programmable computer system such that the respective method is performed. Generally, the invention thus also consists in a computer program product with a program code stored on a machine-readable carrier for performing the inventive method, when the computer program product runs on a computer. In other words, the invention may thus be realized as a computer program with a program code for performing the method, when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A texture synthesis device comprising:
a determinator for determining a prioritization among regions to be synthesized of an area to be synthesized as a function of image information in an area adjacent to the area to be synthesized; and
a synthesizer for synthesizing the regions to be synthesized in an order that depends on the prioritization,
wherein the determinator and the synthesizer are formed such that, after a synthesization of one or several of the regions to be synthesized by the synthesizer, the determinator iteratively determines the prioritization among the remaining regions to be synthesized, as a function of the image information in the area adjacent to the area to be synthesized, including the one or several synthesized regions, and
wherein the synthesizer, in the case that the synthesizer does not find a suitable synthesization for any of the remaining regions to be synthesized, is formed to cancel the synthesization and to fill the remaining regions to be synthesized by means of interpolation,
wherein at least one of the determinator and the synthesizer comprises a hardware implementation, and
wherein the determinator is formed to perform the prioritization such that regions to be synthesized which are adjacent to regions comprising image information more relevant to human perception are given higher priority than those which are adjacent to regions comprising image information less relevant to human perception.

2. The texture synthesis device according to claim 1, wherein the determinator is formed to perform the prioritization such that regions to be synthesized which are adjacent to regions comprising image information of a higher spatial object outline value are given higher priority than those which are adjacent to regions comprising image information of a lower spatial object outline value.

3. The texture synthesis device according to claim 1, wherein the determinator is formed to determine the prioritization as a function of a distribution of gradient intensities of a gradient field of the image information in the image area adjacent to the area to be synthesized.

4. The texture synthesis device according to claim 3, wherein the determinator is formed to extend a gradient field of the image information in the image area adjacent to the area to be synthesized by inter- or extrapolation from the area adjacent to the area to be synthesized into the area to be synthesized, and to determine the prioritization as a function of the extended distribution of gradient intensities.

5. The texture synthesis device according to claim 1, wherein the determinator is formed to determine the prioritization as a function of a size of that proportion of the regions adjacent to the regions to be synthesized which comprises image information.

6. The texture synthesis device according to claim 1, wherein the determinator is formed to perform the prioritization pixel by pixel in order to associate pixels of the area to be synthesized one priority value each.

7. The texture synthesis device according to claim 1, wherein the area to be synthesized and the area adjacent to the area to be synthesized are spatially and temporally extended portions of a video.

8. The texture synthesis device according to claim 1, wherein the area to be synthesized and the area adjacent to the area to be synthesized are portions of a still image.

9. The texture synthesis device according to claim 1, wherein the regions to be synthesized are pixels or clusters of pixels.

10. The texture synthesis device according to claim 1, wherein the synthesizer is formed to determine, for synthesization, a position of a texture patch relative to the area adjacent to the area to be synthesized such that a similarity measure between the texture patch and the area adjacent to the area to be synthesized is reduced, and to adopt, in the determined position, image information from the texture patch at a position corresponding to one of the regions to be synthesized into the one of the regions to be synthesized, wherein this region to be synthesized is synthesized.

11. The texture synthesis device according to claim 10, wherein the synthesizer is formed to adopt the image information from the texture patch as a function of whether the image information to be adopted from the texture patch meet a coherence criterion in order to reduce an introduction of artifacts by the synthesization.

12. The texture synthesis device according to claim 11, wherein the synthesizer is formed so that, according to the coherence criterion, image information to be adopted for a pixel to be synthesized must be within an intersection of intervals the borders of which are determined by pixel values of diagonal, horizontal and vertical neighboring pairs.

13. The texture synthesis device according to claim 10, wherein the synthesizer is formed to adopt image information from the texture patch at the determined position also at an already synthesized region into same, when a similarity measure indicates a higher level of similarity than a similarity measure that was determined for a texture patch in a further position, from which, in this further position, the image information were last adopted into the already synthesized region.

14. The texture synthesis device according to claim 13, wherein the synthesizer is formed to determine the interpolation on the basis of the previously synthesized regions or solely on the basis of the area adjacent to the area to be synthesized.

15. The texture synthesis device according to claim 1, wherein the synthesizer, in the case that the synthesizer does not find a suitable synthesization for a region to be synthesized whose turn it is according to the order, is formed to block this region to be synthesized and to continue with a region to be synthesized which is not blocked and whose turn it is next according to the order.

16. The texture synthesis device according to claim 15, wherein the synthesizer, in the case that the synthesizer synthesizes a region to be synthesized which is adjacent to the blocked region to be synthesized, is formed to unblock the blocked region to be synthesized.

17. A method for texture synthesis, comprising:
   determining a prioritization among regions to be synthesized of an area to be synthesized, as a function of image information in an area adjacent to the area to be synthesized, by a determinator; and
   synthesizing the regions to be synthesized in an order that depends on the prioritization, by a synthesizer,
   wherein determining and synthesizing are performed such that, after a synthesization of one or several of the regions to be synthesized, the prioritization is iteratively determined among the remaining regions to be synthesized, as a function of the image information in the area adjacent to the area to be synthesized, including the one or several synthesized regions, and
   wherein synthesizing, in the case that no suitable synthesization for any of the remaining regions to be synthesized is found, is performed so as to cancel the synthesization and to fill the remaining regions to be synthesized by means of interpolation,
   wherein at least one of the determinator and the synthesizer comprises a hardware implementation, and wherein the determination of the prioritization is performed such that regions to be synthesized which are adjacent to regions comprising image information more relevant to human perception are given higher priority than those which are adjacent to regions comprising image information less relevant to human perception.

18. A non-transitory computer readable medium having stored thereon a computer program with a program code for performing, when the computer program is executed on a computer, a method for texture synthesis, the method comprising:
   determining a prioritization among regions to be synthesized of an area to be synthesized, as a function of image information in an area adjacent to the area to be synthesized; and
   synthesizing the regions to be synthesized in an order that depends on the prioritization,
   wherein determining and synthesizing are performed such that, after a synthesization of one or several of the regions to be synthesized, the prioritization is iteratively determined among the remaining regions to be synthesized, as a function of the image information in the area adjacent to the area to be synthesized, including the one or several synthesized regions, and
   wherein synthesizing, in the case that no suitable synthesization for any of the remaining regions to be synthesized is found, is performed so as to cancel the synthesization and to fill the remaining regions to be synthesized by means of interpolation, and wherein the determination of the prioritization is performed such that regions to be synthesized which are adjacent to regions comprising image information more relevant to human perception are given higher priority than those which are adjacent to regions comprising image information less relevant to human perception.

19. A texture synthesis device comprising:
   a determinator for determining a prioritization among regions to be synthesized of an area to be synthesized as a function of image information in an area adjacent to the area to be synthesized; and
   a synthesizer for synthesizing the regions to be synthesized in an order that depends on the prioritization,
   wherein the determinator and the synthesizer are formed to perform the determination and synthesizing alternately in consecutive iterations such that, after a synthesization of one or several of the regions to be synthesized by the synthesizer within preceding iterations, the determinator determines the prioritization among the remaining regions to be synthesized within a current iteration, as a function of the image information in the area adjacent to the area to be synthesized, including the one or several synthesized regions, and
   wherein the synthesizer, in the case that the synthesizer does not find a suitable synthesization for any of the remaining regions to be synthesized in the current iteration, is formed to abort the performance of the determination and synthesizing in the consecutive iterations and to fill the remaining regions to be synthesized by means of interpolation using the image information in an area adjacent to the remaining regions, including the one or several synthesized regions,
   wherein at least one of the determinator and the synthesizer comprises a hardware implementation.

20. A method for texture synthesis, comprising:
determining a prioritization among regions to be synthesized of an area to be synthesized, as a function of image information in an area adjacent to the area to be synthesized, by a determinator; and
synthesizing the regions to be synthesized in an order that depends on the prioritization, by a synthesizer,
wherein determining and synthesizing are performed alternately in consecutive iterations such that, after a synthesization of one or several of the regions to be synthesized within preceding iterations, the prioritization is determined among the remaining regions to be synthesized within a current iteration, as a function of the image information in the area adjacent to the area to be synthesized, including the one or several synthesized regions, and
wherein synthesizing, in the case that no suitable synthesization for any of the remaining regions to be synthesized is found in the current iteration, is performed so as to abort the performance of the determination and synthesizing in the consecutive iterations and to fill the remaining regions to be synthesized by means of interpolation using the image information in an area adjacent to the remaining regions, including the one or several synthesized regions,
wherein at least one of the determinator and the synthesizer comprises a hardware implementation.

* * * * *